United States Patent
Kira et al.

(10) Patent No.: US 11,560,499 B2
(45) Date of Patent: Jan. 24, 2023

(54) ADHESIVE COMPOSITION, ADHESIVE LAYER AND ADHESIVE SHEET

(71) Applicant: NITTO DENKO CORPORATION, Ibaraki (JP)

(72) Inventors: Yoshiko Kira, Ibaraki (JP); Kensuke Tani, Ibaraki (JP); Ryoko Asai, Ibaraki (JP); Kayo Shimokawa, Ibaraki (JP); Kenichi Okada, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 753 days.

(21) Appl. No.: 16/465,475

(22) PCT Filed: Nov. 29, 2017

(86) PCT No.: PCT/JP2017/042927
§ 371 (c)(1),
(2) Date: May 30, 2019

(87) PCT Pub. No.: WO2018/101372
PCT Pub. Date: Jun. 7, 2018

(65) Prior Publication Data
US 2019/0292425 A1    Sep. 26, 2019

(30) Foreign Application Priority Data

Nov. 30, 2016  (JP) .............................. JP2016-232749
Nov. 29, 2017  (JP) .............................. JP2017-229395

(51) Int. Cl.
| | | |
|---|---|---|
| *C09J 153/02* | (2006.01) | |
| *C09J 7/32* | (2018.01) | |
| *C09J 11/06* | (2006.01) | |
| *C09J 11/08* | (2006.01) | |
| *C09J 201/00* | (2006.01) | |
| *C09J 7/20* | (2018.01) | |
| *C09J 7/00* | (2018.01) | |
| *C09J 133/00* | (2006.01) | |
| *C09J 121/00* | (2006.01) | |
| *C08G 18/76* | (2006.01) | |
| *C09J 123/22* | (2006.01) | |
| *C09J 133/10* | (2006.01) | |
| *C09J 135/00* | (2006.01) | |

(52) U.S. Cl.
CPC ........ *C09J 153/02* (2013.01); *C08G 18/7621* (2013.01); *C09J 7/00* (2013.01); *C09J 7/20* (2018.01); *C09J 7/32* (2018.01); *C09J 11/06* (2013.01); *C09J 11/08* (2013.01); *C09J 121/00* (2013.01); *C09J 123/22* (2013.01); *C09J 133/00* (2013.01); *C09J 133/10* (2013.01); *C09J 135/00* (2013.01); *C09J 201/00* (2013.01); *C09J 2409/00* (2013.01); *C09J 2423/00* (2013.01); *C09J 2453/00* (2013.01)

(58) Field of Classification Search
CPC ..................................................... C09J 153/02
See application file for complete search history.

(56) References Cited

U.S. PATENT DOCUMENTS

| | | | |
|---|---|---|---|
| 2002/0077420 | A1 | 6/2002 | Chiba et al. |
| 2006/0279922 | A1 | 12/2006 | Cho et al. |
| 2009/0291238 | A1* | 11/2009 | Scott ............... C08F 283/12 524/588 |
| 2010/0104831 | A1 | 4/2010 | Kanagawa et al. |
| 2014/0138013 | A1 | 5/2014 | Attarawala et al. |
| 2016/0369061 | A1* | 12/2016 | Dinkar ................. C08K 5/5425 |
| 2018/0051193 | A1 | 2/2018 | Shim et al. |
| 2019/0277805 | A1* | 9/2019 | Wrobel ............... G01N 29/346 |

FOREIGN PATENT DOCUMENTS

| | | |
|---|---|---|
| CN | 104955913 A | 9/2015 |
| EP | 1195405 A1 | 4/2002 |
| JP | S58-171460 A | 10/1983 |
| JP | H2-11688 A | 1/1990 |
| JP | H9-316228 A | 12/1997 |
| JP | 2000-273418 A | 10/2000 |
| JP | 2001-49075 A | 2/2001 |
| JP | 2001-354749 A | 12/2001 |
| JP | 2002-188071 A | 7/2002 |
| JP | 2008-163502 A | 7/2008 |
| JP | 2009-144068 A | 7/2009 |
| JP | 2011-166 A | 4/2011 |
| JP | 2011-208069 A | 10/2011 |
| JP | 2014-231586 A | 12/2014 |
| TW | 200702410 A | 1/2007 |
| TW | 200911947 A | 3/2009 |
| TW | 201137043 A | 11/2011 |
| TW | 201305305 A | 2/2013 |
| TW | 201502225 A | 1/2015 |
| WO | 2014/115521 A1 | 7/2014 |
| WO | 2016/153294 A1 | 9/2016 |

OTHER PUBLICATIONS

Nitto Electric, electronic translation of JP 58-171460 (1983).*
Examination Report issued for corresponding Indian Patent Application No. 201917021449 dated Feb. 19, 2021.
Office Action issued in corresponding Chinese Patent Application No. 201780074035.1 dated Jul. 2, 2020, along with an English translation.
Extended European Search Report issued in corresponding European Patent Application No. 17876986.5 dated Jul. 6, 2020.

(Continued)

*Primary Examiner* — Jeffrey C Mullis
(74) *Attorney, Agent, or Firm* — Hauptman Ham, LLP

(57) ABSTRACT

The present invention relates to an adhesive composition containing a base polymer and a moisture-curable component, wherein the base polymer contains a polymer having no functional group which reacts with the moisture-curable component, and a water content of the base polymer after storage at 25° C. and 50% RH for 24 hours is 0.1% by weight or less, and wherein the moisture-curable component is contained in an unreacted state, an adhesive layer made from the adhesive composition, and an adhesive sheet including the adhesive layer.

7 Claims, No Drawings

(56) References Cited

OTHER PUBLICATIONS

Office Action issued for corresponding Taiwanese Patent Application No. 106141876 dated Mar. 9, 2021, along with an English translation.
Office Action dated Oct. 22, 2021, for corresponding Korean Patent Application No. 10-2019-7015193, along with an English machine translation.
Office Action dated Dec. 7, 2021 for corresponding Japanese Patent Application No. 2017-229394, along with an English translation.
Office Action dated Dec. 7, 2021 for corresponding Japanese Patent Application No. 2017-229395, along with an English translation.
Written Opinion for corresponding international application PCT/JP2017/042927 dated Jan. 23, 2018.
International Search Report for corresponding international application PCT/JP2017/042927 dated Jan. 23, 2018.
Office Action dated May 17, 2022 for corresponding Japanese Patent Application No. 2017-229394, along with an English translation.
Office Action dated May 17, 2022 for corresponding Japanese Patent Application No. 2017-229395, along with an English translation.

\* cited by examiner

ADHESIVE COMPOSITION, ADHESIVE LAYER AND ADHESIVE SHEET

CROSS REFERENCE TO RELATED APPLICATION

This application claims the priority of Japanese Patent Application No. 2016-232749, filed on Nov. 30, 2016 and Japanese Patent Application No. 2017-229395, filed on Nov. 29, 2017, in the JPO (Japanese Patent Office). Further, this application is the National Phase Application of International Application No. PCT/JP2017/042927, filed on Nov. 29, 2017, which designates the United States and was published in Japan. Both of the priority documents are hereby incorporated by reference in their entireties.

TECHNICAL FIELD

The present invention relates to an adhesive composition, an adhesive layer made from the adhesive composition, and an adhesive sheet including the adhesive layer.

BACKGROUND ART

Conventionally, a primer composition has been used for the purpose of waterproofing of concrete and the like. For example, Patent Literature 1 describes that a coating composition obtained by mixing a specific resin composition and a specific moisture-curable solution can be used as a primer composition having excellent close adhesiveness to a wet surface.

Further, Patent Literature 2 describes a photopolymerizable composition which can provide a moisture-curable adhesive having sufficient adhesive strength to an adherend having an uneven surface such as an inorganic material, e.g., concrete or the like, or wood by photopolymerization, and a moisture-curable adhesive sheet obtained by using this composition.

CITATION LIST

Patent Literature

Patent Literature 1: JP-A-2001-354749
Patent Literature 2: JP-A-2000-273418

SUMMARY OF INVENTION

Technical Problem

However, since the coating composition described in Patent Literature 1 is used as a liquid primer composition and requires a coating operation and subsequent drying, there is a problem in view of operation efficiency.

Moreover, in Patent Literature 2, the adhesive strength to an adherend having an uneven surface such as an inorganic material, e.g., concrete or the like, or wood is investigated but the adhesive strength with respect to a wet surface is not investigated at all.

As a result of intensive studies for the purpose of providing an adhesive sheet that can well adhere to a wet surface, the present inventors have conceived to use an adhesive composition containing a moisture-curable component in an unreacted state as an adhesive composition that forms an adhesive layer. Based thereon, they have obtained a finding that it is important to maintain the unreacted state of the moisture-curable component high, in order to obtain good adhesiveness to the wet surface.

Accordingly, it is an object of the present invention to provide an adhesive composition which give high adhesive force to a wet surface owing to excellent storage stability of a moisture-curable component, an adhesive layer made from the adhesive composition, and an adhesive sheet including the adhesive layer.

Solution to Problem

One aspect of the present invention relates to an adhesive composition comprising a base polymer and a moisture-curable component, wherein the base polymer contains a polymer having no functional group which reacts with the moisture-curable component, and a water content of the base polymer after storage at 25° C. and 50% RH for 24 hours is 0.1% by weight or less, and wherein the moisture-curable component is contained in an unreacted state.

In one aspect of the present invention, the base polymer may have a moisture permeability at 40° C. and 90% RH of 25 g/m$^2$·24 hr or less at the time when forming a layer having a thickness of 100 μm.

In one aspect of the present invention, the base polymer may contain a rubber-based polymer or an acrylic polymer.

In one aspect of the present invention, the moisture-curable component may be capable of chemically bonding to an adherend.

In one aspect of the present invention, the moisture-curable component may be an aliphatic isocyanate or an alicyclic isocyanate.

In one aspect of the present invention, the adhesive composition may further contain a water-absorbing material.

In one aspect of the present invention, the water-absorbing material may be a water-absorbing polymer.

Further, one aspect of the present invention relates to an adhesive layer comprising the above-described adhesive composition.

Moreover, one aspect of the present invention relates to an adhesive sheet comprising the above-described adhesive layer.

In one aspect of the present invention, the adhesive layer may be formed on a substrate.

Advantageous Effects of Invention

According to the present invention, there are provided an adhesive composition which give high adhesive force to a wet surface owing to excellent storage stability of a moisture-curable component, an adhesive layer made from the adhesive composition, and an adhesive sheet including the adhesive layer.

DESCRIPTION OF EMBODIMENTS

Hereinafter, embodiments of the present invention will be described in detail.

The adhesive composition according to an embodiment of the present invention is an adhesive composition containing a base polymer and a moisture-curable component, wherein the base polymer contains a polymer having no functional group which reacts with the moisture-curable component and the water content of the base polymer after storage at 25° C. and 50% RH for 24 hours is 0.1% by weight or less, the moisture-curable component being contained in an unreacted state.

When an adhesive layer made from the adhesive composition according to the present embodiment or an adhesive sheet including the adhesive layer (hereinafter collectively also referred to as adhesive sheet) is pasted to a wet surface of an adherend, the moisture-curable component contained in an unreacted state in the adhesive composition (adhesive layer) reacts with the water absorbed from the wet surface of the adherend or water such as the surrounding water or moisture to undergo moisture curing, and thereby, the adhesive force to the adherend is increased. As a result, when the adhesive sheet is pasted to the wet surface of the adherend, the adhesive force is increased with time and high adhesive force can be exhibited. Incidentally, the case where the moisture-curable component is capable of chemically bonding to the adherend is preferred because the adhesive force to the adherend surface is further improved by the progress of the chemical bond between the moisture-curable component capable of chemically bonding to the adherend contained in an unreacted state in the adhesive composition (adhesive layer) and the adherend surface.

Here, when the water content of the base polymer contained in the adhesive composition is high, surrounding water (water and moisture) is easily accumulated in the adhesive composition (adhesive layer), and as a result, there is a concern that the moisture-curable component may react with the surrounding water (water or moisture) to cause moisture curing at any stages, for example, at the time of storage of the adhesive composition, at the time of preparation of an adhesive sheet from the adhesive composition, at the time of storage of the adhesive sheet, or before the adhesive sheet is pasted to an adherend. As a result, the preparation of the adhesive layer or the adhesive sheet from the adhesive composition or the pasting of the adhesive sheet to an adherend may become difficult or a sufficient adhesive force may not be exhibited after pasting.

Therefore, in the adhesive composition of the present embodiment, the water content of the base polymer after storage at 25° C. and 50% RH for 24 hours (hereinafter also referred to simply as water content) is controlled to 0.1% by weight or less (1000 ppm or less). When the water content of the base polymer is 0.1% by weight or less, the accumulation of surrounding water (water and moisture) in the adhesive composition (adhesive layer) can be sufficiently prevented or suppressed at each stage, for example, at the time of storage of the adhesive composition, at the time of preparation of an adhesive sheet from the adhesive composition, at the time of storage of the adhesive sheet, or before the adhesive sheet is pasted to an adherend. Thereby, the reaction between the moisture-curable component and surrounding water (water or moisture) can be prevented or suppressed at each stage before the adhesive sheet is pasted to the adherend and thus an adhesive composition, an adhesive layer, or an adhesive sheet excellent in storage stability can be obtained. As a result, such an adhesive sheet can be pasted well to the wet surface of the adherend and good adhesive force can be exhibited. The water content is preferably 0.08% by weight or less, and more preferably 0.05% by weight or less. Incidentally, the water content is preferably low and the lower limit thereof is not specifically limited but, for example, is 0.01% by weight.

The water content of the base polymer after storage at 25° C. and 50% RH can be measured by Karl Fischer moisture vaporization-coulometric titration method (JIS K 0113: 2005). Specifically, using Hiranuma trace-level water content measuring device AQ-2100 manufactured by Hiranuma Sangyo Co., Ltd., the amount of water generated by heating and vaporization at 200° C. for 30 minutes is measured, and the ratio to the sample weight before heating can be calculated as the moisture content.

Water content (%)=(water content measured by Karl Fischer method/Total weight of sample before measurement)×100

In addition, in the adhesive composition of the present embodiment, the base polymer contains a polymer having no functional group that reacts with the moisture-curable component. As such a polymer, for example, a polymer having no functional group (nonfunctional polymer) may be mentioned. Alternatively, it may be a polymer having a functional group that does not react with the moisture-curable component.

By using the polymer having no functional group that reacts with the moisture-curable component as the base polymer, the reaction between the base polymer and the moisture-curable component is prevented at each stage before the adhesive sheet is pasted to the adherend, and thus, an adhesive composition, an adhesive layer or an adhesive sheet excellent in storage stability can be obtained. As a result, such an adhesive sheet can be pasted well to the wet surface of the adherend and can exhibit good adhesive force.

Here, as the functional group that reacts with the moisture-curable component, polar functional groups such as a carboxyl group, a hydroxyl group, an amide group, an amino group, a cyano group, a sulfonic acid group, a phosphoric acid group, an imide group, an isocyanate group, an alkoxy group, and a silanol group can be mentioned.

In the adhesive composition according to the present embodiment, examples of the above-described polymer include acrylic polymers, rubber-based polymers, silicone-based polymers, urethane-based polymers, and the like. Among these, those having a water content of 0.1% by weight or less and having no functional group that reacts with the moisture-curable component can be appropriately selected and used. Incidentally, since the functional group capable of reacting with the moisture-curable component is a functional group capable of reacting also with water, the affinity with water is high and the water content becomes high, so that such functional group is not preferable. Among the polymers exemplified above, acrylic polymers and rubber-based polymers are preferable from the viewpoint of adhesiveness, and rubber-based polymers are more preferable from the viewpoint of moisture permeability. The less moisture-permeable material is less susceptible to the humidity of the external environment and less likely to incorporate water into the polymer, so that the reaction between the moisture-curable component and water can be delayed. The moisture permeability relates to the solubility and diffusivity of water in the polymer, and a polymer having a functional group capable of reacting with the moisture-curable component increases the solubility of water in the polymer and reduces the diffusivity thereof, so that such polymer is unsuitable. The storage stability of the moisture-curable component can be ensured by protecting the moisture-curable component with a material having a low moisture content or low moisture permeability.

In the present embodiment, examples of the rubber-based polymer include isobutylene-based polymers such as polyisobutylene (PIB), a copolymer of isobutylene and normal butylene, a copolymer of isobutylene and isoprene (e.g., butyl rubbers such as regular butyl rubber, chlorinated butyl rubber, brominated butyl rubber, and partially crosslinked butyl rubber), and vulcanized products thereof; styrene-based thermoplastic elastomers such as styrene-ethylene-butylene-styrene block copolymer (SEBS), styrene-isoprene-styrene block copolymer (SIS), isoprene rubber (IR), styrene-butadiene-styrene block copolymer (SBS), styrene-ethylene-propylene-styrene block copolymer (SEPS, hydrogenated product of SIS), styrene-ethylene-propylene block copolymer (SEP, hydrogenated product of styrene-isoprene block copolymer), styrene-isobutylene-styrene block copolymers (SIBS), and styrene-based block copolymers such as styrene-butadiene rubber (SBR); butyl rubber (IIR), butadiene rubber (BR), acrylonitrile-butadiene rubber (NBR), EPR (binary ethylene-propylene rubber), EPT (ternary ethylene-propylene rubber), acrylic rubber, urethane rubber, silicone rubber, and the like. Among them, since the water content is low, PIB, IIR, IR, SIS, and SIBS are preferable, and PIB is more preferable. Incidentally, only one kind thereof may be used alone, or two or more kinds may be used in combination.

Further, as polymers for rubber modifiers, for example, polymers of low polarity such as aliphatic hydrocarbon resins such as 1,3-pentadiene-based polymers and polybutene, dicyclopentadiene-based alicyclic hydrocarbon resins, and petroleum-based softeners (paraffinic oil, naphthenic oil, and aromatic oil) may be used.

Moreover, in the present embodiment, the acrylic polymer is a polymer containing a (meth)acrylic acid ester as a main monomer component, and one containing a (meth) acrylic acid alkyl ester ((meth)acrylic acid alkyl ester having a linear or branched alkyl group) as a main monomer component can be suitably used. Examples of the (meth) acrylic acid alkyl ester include (meth)acrylic acid alkyl esters having an alkyl group having 1 to 20 carbon atoms, such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. Among them, (meth)acrylic acid alkyl esters having an alkyl group having 1 to 14 carbon atoms are preferable, and (meth)acrylic acid alkyl esters having an alkyl group having 2 to 10 carbon atoms are more preferable. Incidentally, the above "(meth)acrylic acid ester" represents "acrylic acid ester" and/or "methacrylic acid ester", and the same shall apply in others.

In addition, as (meth)acrylic acid esters other than the above (meth)acrylic acid alkyl esters, examples thereof include (meth)acrylic acid esters having an alicyclic hydrocarbon group, such as cyclopentyl (meth)acrylate, cyclohexyl (meth)acrylate, and isobornyl (meth)acrylate, and (meth)acrylic acid esters having an aromatic hydrocarbon group, such as phenyl (meth)acrylate.

The (meth)acrylic acid esters can be used alone, or two or more kinds can be used in combination. Further, a monomer other than the acrylic monomers may be copolymerized with the (meth)acrylic acid ester as long as the monomer is a monomer having no polar functional group.

In the present embodiment, of the monomer components constituting the acrylic polymer, a (meth)acrylic acid alkyl ester accounts for preferably 80% by weight or more, more preferably 90% by weight or more, and still more preferably 100% by weight.

In the present embodiment, in order to obtain an acrylic polymer having no functional group that reacts with the moisture-curable component, it is important not to use a monomer having a functional group capable of reacting with the moisture-curable component, such as a polar group-containing monomer or a polyfunctional monomer.

Examples of such a polar group-containing monomer include carboxyl group-containing monomers such as (meth)acrylic acid, itaconic acid, maleic acid, fumaric acid, crotonic acid, and isocrotonic acid or anhydrides thereof (maleic anhydride etc.); hydroxyl group-containing monomers such as hydroxyalkyl (meth)acrylates, e.g., hydroxyethyl (meth)acrylate, hydroxypropyl (meth)acrylate, hydroxybutyl (meth)acrylate, and the like; amide group-containing monomers such as acrylamide, methacrylamide, N,N-dimethyl(meth)acrylamide, N-methylol(meth)acrylamide, N-methoxymethyl(meth)acrylamide, and N-butoxymethyl(meth)acrylamide; amino group-containing monomers such as aminoethyl (meth)acrylate, dimethylaminoethyl (meth)acrylate, and t-butylaminoethyl (meth)acrylate; glycidyl group-containing monomers such as glycidyl (meth)acrylate and methylglycidyl (meth)acrylate; cyano group-containing monomers such as acrylonitrile and methacrylonitrile; heterocyclic ring-containing vinyl monomers such as N-vinyl-2-pyrrolidone, (meth)acryloylmorpholine, in addition, N-vinylpyridine, N-vinylpiperidone, N-vinylpyrimidine, N-vinylpiperazine, N-vinylpyrrole, N-vinylimidazole, and N-vinyloxazole; alkoxyalkyl (meth)acrylate-based monomers such as methoxyethyl (meth)acrylate and ethoxyethyl (meth)acrylate; sulfonic acid group-containing monomers such as sodium vinylsulfonate; phosphoric acid group-containing monomers such as 2-hydroxyethyl acryloylphosphate; imide group-containing monomers such as cyclohexylmaleimide and isopropylmaleimide; isocyanate group-containing monomers such as 2-methacryloyloxyethyl isocyanate; and the like.

Moreover, examples of the polyfunctional monomer include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, and the like.

Further, in the present embodiment, the base polymer has a moisture permeability at 40° C. and 90% RH (hereinafter, also simply referred to as moisture permeability) of 25 g/m$^2$·24 hr or less when forming a layer having a thickness of 100 μm (also referred to as polymer sheet or polymer layer). When the moisture permeability is 25 g/m$^2$·24 hr or less, infiltration of surrounding water and moisture into the adhesive composition (adhesive layer) at each stage before the adhesive sheet is pasted to the adherend can be well prevented or suppressed. Thereby, the reaction between the moisture-curable component and the surrounding water or moisture at each stage before the adhesive sheet is pasted to the adherend can be more satisfactorily prevented or suppressed, and thus the storage stability of the adhesive composition, the adhesive layer, and the adhesive sheet can be made more excellent. The moisture permeability is preferably 23 g/m$^2$·24 hr or less, and more preferably 20 g/m$^2$·24 hr or less. Incidentally, the moisture permeability is preferably low and the lower limit thereof is not particularly limited, but is, for example, 10 g/m$^2$·24 hr.

The moisture permeability of the base polymer at 40° C. and 90% RH when forming a layer having a thickness of 100 μm can be measured by water vapor permeability (JIS K 7129: 2008). Specifically, it can be measured, for example, by the measurement method described in the section of EXAMPLES to be mentioned later.

Moreover, in the base polymer, polymers such as modifiers other than the above-mentioned polymer having no functional group that reacts with the moisture-curable component (hereinafter also referred to as other polymers) may be contained within the range where the advantageous effects of the present invention are not significantly impaired. In that case, the content ratio of the other polymer to the whole base polymer (100% by weight) is preferably 75% by weight or less, more preferably 60% by weight or less.

In addition, the content of the polymer having no functional group that reacts with the moisture-curable component based on the whole base polymer (100% by weight) may be 100% by weight, but in the case of containing other polymers, the content is preferably 80% by weight or less, and more preferably 60% by weight or less. Further, the content of the polymer having no functional group that reacts with the moisture-curable component is preferably 30% by weight or more, and more preferably 40% by weight or more, in order to exhibit the above-described effects well.

Incidentally, in the adhesive composition of the present embodiment, from the viewpoint of the storage stability of the moisture-curable component before the adhesive sheet is pasted to the wet surface of the adherend, it is preferred not to contain a polymer having a functional group that reacts with the moisture-curable component in the base polymer. Here, as the functional group which reacts with the moisture-curable component, polar functional groups such as a carboxyl group, a hydroxyl group, an amide group, an amino group, a cyano group, a sulfonic acid group, a phosphoric acid group, an imide group, an isocyanate group, an alkoxy group, and a silanol group may be mentioned.

However, it is acceptable to contain the polymer having a functional group capable of reacting with the moisture-curable component when the content thereof is in a range where the advantageous effects of the invention are not remarkably inhibited, for example, the content ratio relative to 100% by weight of the whole base polymer is 1% by weight or less.

In the case where the adhesive composition contains a polymerization initiator, a curing reaction by heat or an active energy ray using a polymerization initiator such as a thermal polymerization initiator or a photopolymerization initiator (photoinitiator) can be utilized. The polymerization initiator can be used alone, or two or more kinds can be used in combination.

The photopolymerization initiator is not particularly limited, and there can be used benzoin ether-based photopolymerization initiators, acetophenone-based photopolymerization initiators, α-ketol-based photopolymerization initiators, aromatic sulfonyl chloride-based photopolymerization initiators, photoactive oxime-based photopolymerization initiators, benzoin based photopolymerization initiators, benzil-based photopolymerization initiators, benzophenone-based photopolymerization initiators, ketal-based photopolymerization initiators, thioxanthone-based photopolymerization initiators, and the like.

Specifically, examples of the benzoin ether-based photopolymerization initiators include benzoin methyl ether, benzoin ethyl ether, benzoin propyl ether, benzoin isopropyl ether, benzoin isobutyl ether, 2,2-dimethoxy-1,2-diphenylethan-1-one, anisole methyl ether, and the like. Examples of the acetophenone-based photopolymerization initiators include 2,2-diethoxyacetophenone, 2,2-dimethoxy-2-phenylacetophenone, 1-hydroxycyclohexyl phenyl ketone, 4-phenoxydichloroacetophenone, 4-(t-butyl)dichloroacetophenone, and the like. Examples of the α-ketol-based photopolymerization initiators include 2-methyl-2-hydroxypropiophenone, 1-[4-(2-hydroxyethyl)phenyl]-2-methylpropan-1-one, and the like. Examples of the aromatic sulfonyl chloride-based photopolymerization initiators include 2-naphthalene sulfonyl chloride and the like. Examples of the photoactive oxime-based photopolymerization initiators include 1-phenyl-1,1-propanedione-2-(o-ethoxycarbonyl)-oxime and the like.

The benzoin photopolymerization initiators include, for example, benzoin. The benzil-based photopolymerization initiators include, for example, benzil and the like. The benzophenone-based photopolymerization initiators include, for example, benzophenone, benzoylbenzoic acid, 3,3'-dimethyl-4-methoxybenzophenone, polyvinylbenzophenone, α-hydroxycyclohexyl phenyl ketone, and the like. The ketal-based photopolymerization initiators includes, for example, benzyl dimethyl ketal and the like. The thioxanthone-based photopolymerization initiators include, for example, thioxanthone, 2-chlorothioxanthone, 2-methylthioxanthone, 2,4-dimethylthioxanthone, isopropylthioxanthone, 2,4-diisopropylthioxanthone, dodecylthioxanthone, and the like.

The amount of the photopolymerization initiator to be used is not particularly limited, and can be selected from the range of, for example, 0.01 to 5 parts by weight (preferably 0.05 to 3 parts by weight) based on 100 parts by weight of all the monomer components for forming the base polymer.

At the time of activation of the photopolymerization initiator, irradiation with active energy rays is performed. Examples of such active energy rays include ionizing radiations such as alpha rays, beta rays, gamma rays, neutron rays, and electron rays, ultraviolet rays, and the like. Particularly, ultraviolet rays are preferable. Further, the irradiation energy of the active energy rays, the irradiation time thereof, and the like are not particularly limited as long as the photopolymerization initiator can be activated to generate the reaction of the monomer components.

Examples of the thermal polymerization initiator include azo polymerization initiators [e.g., 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane) dihydrochloride, 2,2'-azobis[2-(5-methyl-2-imidazolin-2-yl) propane] dihydrochloride, 2,2'-azobis(2-methylpropionamidine) disulfate, 2,2'-azobis(N,N'-dimethyleneisobutylamidine) dihydrochloride, etc.], peroxide-based polymerization initiators (e.g., dibenzoyl peroxide, tert-butyl permaleate, etc.), redox polymerization initiators, and the like. The amount of the thermal polymerization initiator to be used is not particularly limited, and may be in the range that can be conventionally used as a thermal polymerization initiator.

The content of the thermal polymerization initiator is not particularly limited, and is, for example, 0.001% by weight or more, preferably 0.05% by weight or more and 5% by weight or less, preferably 3% by weight or less based on 100% by weight of all the monomer components for forming the base polymer (or the base polymer).

The content of the base polymer in the adhesive composition according to the present embodiment is not particularly limited, but from the viewpoint of the initial adhesive force, based on all the components of the adhesive composition excluding the solvent, that is, when the total amount of the components of the adhesive composition excluding the solvent is regarded as 100% by weight, the content is preferably 5% by weight or more, more preferably 10% by weight or more, and still more preferably 20% by weight or more. Further, the content of the base polymer is, from the viewpoint of containing the moisture-curable component and the like, preferably 90% by weight or less, more preferably 80% by weight or less, and still more preferably 70% by weight or less based on all the components of the adhesive composition excluding the solvent.

In the present embodiment, the moisture-curable component is a component having a property (moisture curability) that causes a curing reaction due to the presence of water (water and moisture). For example, the moisture-curable component includes a resin or a compound which has, in the molecule, one or more hydrolyzable reactive groups or functional groups that start the reaction with water, and which starts curing with water (water or moisture) in the surroundings such as the air.

The moisture-curable component to be used in the adhesive composition of the present embodiment has moisture curability. The moisture-curable component is contained in the adhesive composition in an unreacted state. When an adhesive sheet including an adhesive layer made from the adhesive composition of the present embodiment is pasted to an adherend, the moisture-curable component itself in an unreacted state is cured with the water absorbed from the wet surface or the water such as surrounding water or moisture and thereby adhesiveness is further improved. Moreover, the moisture-curable component is preferably a component capable of chemically bonding to the adherend to which the adhesive sheet is pasted. In such a case, the adhesiveness is further improved by the progress of chemical bonding between the moisture-curable component in an unreacted state and the adherend.

As the moisture-curable component to be used in the present embodiment, isocyanate compounds, alkoxysilyl group-containing polymers, cyanoacrylate-based compounds, urethane-based compounds, and the like may be mentioned. Among them, isocyanate compounds and alkoxysilyl group-containing polymers are preferable in view of compatibility and curing speed. As the moisture-curable component, only one kind may be used alone, or two or more kinds may be used in combination.

An isocyanate compound (isocyanate) is hydrolyzed in the presence of water to form an amine, and curing is achieved by the reaction of the isocyanate with the amine to form a urea bond. In addition, an isocyanate compound can form a chemical bond with a hydroxyl group, an amino group, a carboxyl group, and the like on the surface of an adherend.

As the isocyanate compound, aliphatic isocyanates, alicyclic isocyanates, and aromatic isocyanates are mentioned. Among them, aliphatic isocyanates and alicyclic isocyanates are preferable because they have good compatibility with the base polymer, particularly with the rubber-based polymer, and have mild reactivity with moisture and water.

As the aliphatic isocyanates, there are mentioned ethylene diisocyanate, propylene diisocyanate, tetramethylene diisocyanate, hexamethylene diisocyanate (HDI), trimethylhexamethylene diisocyanate (TMHMDI), dodecamethylene diisocyanate, lysine diisocyanate (LDI), lysine triisocyanate (LTI), and the like.

As the alicyclic isocyanates, there are mentioned isophorone diisocyanate (IPDI), cyclohexylene diisocyanate (CHDI), 4,4'-dicyclohexylmethane diisocyanate, hydrogenated XDI ($H_6$XDI), hydrogenated MDI ($H_{12}$MDI), norbornene diisocyanate (NBDI), and the like.

As the aromatic isocyanate, there are mentioned diphenylmethane diisocyanates (MDI) such as 4,4'-diphenylmethane diisocyanate, 2,4'-diphenylmethane diisocyanate, and 2,2'-diphenylmethane diisocyanate; crude diphenylmethane diisocyanate; polynuclear polyphenylenepolymethyl polyisocyanate (polymeric MDI); tolylene diisocyanates (TDI) such as 2,4-toluene diisocyanate and 2,6-toluene diisocyanate; naphthalene diisocyanates (NDI) such as 1,4-naphthalene diisocyanate and 1,5-naphthalene diisocyanate; 1,5-tetrahydroaphthalene diisocyanate; phenylene diisocyanates (PDI) such as 1,2-phenylene diisocyanate, 1,3-phenylene diisocyanate, and 1,4-phenylene diisocyanate; xylene diisocyanate (XDI); tetramethylxylylene diisocyanate (TMXDI); tolidine diisocyanate (TODI); 2,4,6-trimethylphenyl-1,3-diisocyanate, 2,4,6-triisopropylphenyl-1,3-diisocyanate, chlorophenylene-2,4-diisocyanate, 4,4'-diphenyl ether diisocyanate, 3,3'-dimethyl-4,4'-diphenylmethane diisocyanate, 3,3'-dimethoxy-4,4'-diphenylene diisocyanate, 3,3'-dichloro-4,4'-biphenylene diisocyanate, and the like.

An alkoxysilyl group-containing polymer is hydrolyzed in the presence of water to form a silanol and is cured through condensation (crosslinking). In addition, an alkoxysilyl group-containing polymer can form a strong chemical bond through a dehydration condensation reaction with a hydroxyl group on the surface of an adherend.

As the alkoxysilyl group-containing polymer, for example, there can be used one or more selected from linear dimethoxy group-both terminal type ones such as Silyl SAX220 and Silyl SAT350, linear dimethoxy group-one terminal type ones such as Silyl SAT145, linear trimethoxy group-both terminal type ones such as Silyl SAX510 or Silyl SAT580, branched dimethoxy group-terminal type ones such as Silyl SAT400, and acrylic modified type ones such as Silyl MA440, Silyl MA903, and Silyl MA904 manufactured by Kaneka Corporation.

The content of the moisture-curable component in the adhesive composition according to the present embodiment is not particularly limited, but from the viewpoint of obtaining high adhesive force, based on all the components excluding the solvent of the adhesive composition, that is, when the total amount of the components of the adhesive composition excluding the solvent is regarded as 100% by weight, the content is preferably 0.1% by weight or more, more preferably 0.5% by weight or more, and still more preferably 1% by weight or more. In addition, the content of the moisture-curable component is preferably 50% by weight or less, more preferably 40% by weight or less, and still more preferably 30% by weight or less based on all the components of the adhesive composition excluding the solvent, because there is a concern that anchoring force may be decreased due to excessive curing.

The adhesive composition of the present embodiment preferably further contains a water-absorbing material. In the present embodiment, the water-absorbing material refers to a material capable of absorbing and retaining water. When the adhesive composition contains the water-absorbing material, at the time when the adhesive sheet is pasted to the wet surface of the adherend, the water-absorbing material absorbs and retains the water on the wet surface, which interferes with the adhesion between the adhesive sheet and the adherend, and thereby the initial adhesive force to the adherend, which is required for the adhesive sheet, is well exhibited. In addition, since the water on the wet surface of the adherend is absorbed and removed by the water-absorbing material, the adhesive sheet can well follow even to an adherend having an uneven surface. As a result, the adhesiveness to the wet surface is more easily improved.

As the water-absorbing material, an organic water-absorbing material such as a water-absorbing polymer or an inorganic water-absorbing material can be used. As the water-absorbing material, only one kind may be used alone, or two or more kinds may be used in combination.

Examples of the water-absorbing polymer include polyacrylic acids, water-soluble celluloses, polyvinyl alcohols, polyethylene oxides, starches, alginic acids, chitins, polysulfonic acids, polyhydroxymethacrylates, polyvinylpyrrolidones, polyacrylamides, polyethyleneimines, polyallylamines, polyvinylamines, maleic anhydrides, copolymers thereof, and the like. As the water-absorbing polymer, only one kind may be used alone, or two or more kinds may be used in combination.

Among them, a polyacrylic acid sodium salt or a copolymer of maleic anhydride and polyisobutylene is preferable, and a copolymer of maleic anhydride and polyisobutylene is more preferable.

A commercially available product may be used as the water-absorbing polymer. As commercially available products of the water-absorbing polymers, there can be suitably used, for example, KC flock (cellulose powder, manufactured by Nippon Paper Chemicals Co., Ltd.), Sunrose (carboxymethyl cellulose, manufactured by Nippon Paper Chemicals, Co., Ltd.), Aqualic CA (acrylic acid polymer partial sodium salt crosslinked product, manufactured by Nippon Shokubai Co., Ltd.), Acryhope (acrylic acid polymer partial sodium salt crosslinked product, manufactured by Nippon Shokubai Co., Ltd.), Sunwet (polyacrylate salt crosslinked product, manufactured by San-Dia Polymers, Ltd.), Aqua Pearl (polyacrylate salt crosslinked product, manufactured by San-Dia Polymers, Ltd.), Aqua Keep (acrylic acid polymer partial sodium salt crosslinked product, manufactured by Sumitomo Seika Chemicals Co., Ltd.), Aquacalk (modified polyalkylene oxide, manufactured by Sumitomo Seika Chemicals Co., Ltd.), KI gel (isobutylene-maleic anhydride copolymer crosslinked product, manufactured by Kuraray Co., Ltd.), and the like.

Examples of the inorganic water-absorbing material include silica gel and inorganic polymers such as Sumecton SA manufactured by Kunimine Industries Co., Ltd.

In the adhesive composition according to the present embodiment, the content of the water-absorbing material in the case where the water-absorbing material is further contained is not particularly limited, but from the viewpoint of water absorbability and removability of the water of the adherend and improvement in adhesiveness to the wet surface, based on all the components of the adhesive composition excluding the solvent, that is, when the total amount of the components of the adhesive composition excluding the solvent is regarded as 100% by weight, the content is preferably 0.5% by weight or more, more preferably 1% by weight or more, and still more preferably 2% by weight or more. In addition, the content of the water-absorbing material is, from the viewpoint of adhesive force after moisture curing, preferably 50% by weight or less, more preferably 40% by weight or less, and still more preferably 30% by weight or less based on all the components of the adhesive composition excluding the solvent.

The adhesive composition according to the present embodiment may contain a tackifier (tackifying agent) for the purpose of adjusting the elastic modulus and imparting tackiness at the time of initial adhesion. Examples of the tackifier include polybutenes, rosin-based resins, terpene-based resins, petroleum-based resins (e.g., petroleum-based aliphatic hydrocarbon resins, petroleum-based aromatic hydrocarbon resins, and petroleum-based aliphatic/aromatic copolymerized hydrocarbon resins), petroleum-based alicyclic hydrocarbon resins (hydrogenated ones of aromatic hydrocarbon resins), etc.), coumarone-based resins, and the like. From the viewpoint of compatibility, preferred are petroleum-based resins and rosin-based resins. As the tackifier, one kind may be used or two or more kinds may be used in combination.

The content of the tackifier in the case where it is contained in the adhesive composition is, from the viewpoint of decreasing the elastic modulus, based on all the components of the adhesive composition excluding the solvent, that is, when the total amount of the components of the adhesive composition excluding the solvent is regarded as 100% by weight, the content is preferably 10% by weight or more, more preferably 15% by weight or more, and still more preferably 20% by weight or more. In addition, the content of the tackifier is, from the viewpoint of imparting an appropriate cohesive force to the adhesive, preferably 80% by weight or less, more preferably 70% by weight or less, and still more preferably 60% by weight or less based on all the components of the adhesive composition excluding the solvent.

To the adhesive composition of the present embodiment, in the ranges where the advantageous effects of the present invention are not inhibited, additives usually added to an adhesive composition, such as viscosity modifiers, release modifiers, plasticizers, softeners, fillers, colorants (pigment, dye, etc.), antiaging agents, surfactants, leveling agents, antifoaming agents, light stabilizers, and the like may be further added.

Examples of the filler include inorganic fillers such as talc, titanium oxide, calcium oxide, magnesium oxide, zinc oxide, titanium oxide, calcium carbonate, carbon, silica, clay, mica, barium sulfate, whiskers, magnesium hydroxide, and the like.

The content of the filler is, from the viewpoint of rough surface adhesiveness, preferably 80% by weight or less and more preferably 70% by weight or less based on all the components of the adhesive composition excluding the solvent.

Moreover, various common solvents can be used as a solvent to be utilized for an adhesive composition. Examples of the solvents include organic solvents, e.g., esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; ketones such as methyl ethyl ketone and methyl isobutyl ketone; and the like. The solvents may be used alone, or two or more kinds may be used in combination.

In the adhesive composition of the present embodiment, the elastic modulus (initial elastic modulus) of the adhesive layer when forming an adhesive layer (before moisture curing) is preferably 400 kPa or less, more preferably 300 kPa or less, and still more preferably 200 kPa or less. When the initial elastic modulus is 400 kPa or less, good followability can be exhibited even to an adherend having an uneven surface. In addition, the water absorbency of the water-absorbing material is well exhibited without inhibiting swelling at the time when the water-absorbing material absorbs water on the wet surface of the adherend. Further, in order to form the adhesive layer satisfactorily, the initial elastic modulus is preferably 0.1 kPa or more.

Here, when the adhesive layer is formed, the initial elastic modulus of the adhesive layer can be calculated from the stress-strain curve measured when a sample is prepared by making the adhesive layer into a string shape and is stretched at a speed of 50 mm/min using a tensile tester (AG-IS manufactured by Shimadzu Corporation).

An adhesive layer of the present embodiment is formed using the above-mentioned adhesive composition. The formation method thereof is not particularly limited, but a known method can be adopted, and the formation can be performed in accordance with the following method for producing the adhesive sheet. Incidentally, the preferable range of the amount of each component in the adhesive layer is the same as the preferable range of the amount of each component of the adhesive composition excluding the solvent.

The adhesive layer can be obtained, for example, in the form of an adhesive sheet by applying the adhesive composition to a substrate to be mentioned later using a known coating method and drying the composition. Moreover, after the adhesive composition is applied to a surface having releasability and dried or cured to thereby form an adhesive layer on the surface, the adhesive layer may be pasted to a non-releasable substrate and then transferred thereto. The method for applying the adhesive composition to the substrate is not particularly limited, and the application can be performed using, for example, a gravure roll coater, a reverse roll coater, a kiss roll coater, a dip roll coater, a bar coater, a knife coater, a spray coater, a fountain die coater, a closed edge die coater, or the like. In addition, a solventless coating method such as rolling and extrusion may be applied.

Further, the adhesive layer may be formed by applying the adhesive composition on a release sheet (which may be a sheet-like substrate provided with a release surface).

The thickness of the adhesive layer after drying is not particularly limited, but is preferably 5 to 1000 μm, and more preferably 10 to 500 μm from the viewpoint of exhibiting good followability to an adherend having an uneven surface. The drying temperature may be, for example, 50 to 150° C.

In the case where the adhesive composition (adhesive layer) contains the water-absorbing material, in the surface of the adhesive layer to be pasted to the adherend (pasting surface), the water-absorbing material is exposed at preferably 0.5 to 80% (more preferably 1 to 70%) of the surface area of the pasting surface. When the ratio of the water-absorbing material to the surface area of the pasting surface of the adhesive layer is 0.5% or more, the water on the wet surface of the adherend can be absorbed well. Moreover, when the ratio of the water-absorbing material to the surface area of the pasting surface of the adhesive layer is 80% or less, the adhesive layer can be well adhered to the adherend.

An adhesive sheet of the present embodiment includes the above-described adhesive layer.

The adhesive sheet of the present embodiment may be an adhesive sheet with a substrate in a form having an adhesive layer on one side or both sides of a sheet-like substrate (support), or may be a substrate-less adhesive sheet in a form where the adhesive layer is held by a release sheet. The concept of the adhesive sheet as referred to herein may include those referred to as an adhesive tape, an adhesive label, an adhesive film, and the like.

Incidentally, the adhesive layer is typically formed continuously, but is not limited to such a form, and may be, for example, an adhesive layer formed in a regular or random pattern, such as dot-like or stripe-like one. Further, the adhesive sheet of the present embodiment may be roll-shaped one or sheet-shaped one. Alternatively, it may be an adhesive sheet in a form where it is further processed into various shapes.

Examples of the material that forms the substrate include polyolefin-based films of polyethylene, polypropylene, ethylene/propylene copolymer, and the like; polyester-based films of polyethylene terephthalate and the like; plastic films of polyvinyl chloride and the like; and paper such as kraft paper and Japanese paper; cloths such as cotton cloth and Sufu (spun rayon) cloth; nonwoven fabrics such as polyester nonwoven fabric and vinylon nonwoven fabric; and metal foils. Also, the thickness of the substrate is not particularly limited.

The plastic films may be unstretched films or stretched (uniaxially stretched or biaxial stretched) films. In addition, the surface of the substrate on which the adhesive layer is provided may be subjected to surface treatment such as application of a primer, corona discharge treatment, or the like.

In the present embodiment, the adhesive sheet may be perforated to provide a through hole. In this way, at the time when the adhesive sheet is attached to an adherend, since water on the wet surface of the adherend can be released to the back side (opposite to the pasted surface) of the adhesive sheet through the through hole, more water on the wet surface of the adherend can be removed.

In the adhesive sheet of the present embodiment, the adhesive layer may be protected with a release liner (separator, release film) until the time of use. In addition, the protection due to the release liner is also useful for maintaining the unreacted state of the unreacted moisture-curable component in the adhesive layer.

As the release liner, a conventional release paper can be used, and is not particularly limited. For example, a substrate having a release-treated layer, a low adhesive substrate composed of a fluorine-based polymer, a low adhesive substrate composed of a nonpolar polymer, or the like can be used. Examples of the substrate having a release-treated layer include plastic films, paper, and the like which have been surface-treated with a release treatment agent such as silicone-based one, long chain alkyl-based one, fluorine-based one, or molybdenum sulfide. Examples of the fluorine-based polymer of the low adhesive substrate composed of a fluorine-based polymer include polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer, and the like. Examples of the nonpolar polymer of the low-adhesive substrate composed of a nonpolar polymer include olefin-based resins (e.g., polyethylene, polypropylene, etc.), and the like. Incidentally, the release liner can be formed by a known or conventional method. In addition, the thickness and the like of the release liner are not particularly limited.

In the adhesive composition according to the present embodiment, the adhesive layer made from the adhesive composition, or the adhesive sheet including the adhesive layer, the moisture-curable component is contained in an unreacted state. Here, the unreacted state indicates a state where a curing reaction is not generated by water (water or moisture). In the present embodiment, all of the moisture-curable component is preferably in an unreacted state, but a part of the moisture-curable component may be in a reacted state as long as the advantageous effects of the present invention are exhibited. This case is also included in the case where the moisture-curable component in the present embodiment is contained in an unreacted state.

In the adhesive sheet (adhesive layer) of the present embodiment, the maintenance ratio (remaining ratio) of the moisture-curable component in the adhesive composition after storage at 25° C. and 50% RH for 24 hours is preferably 30% or more, more preferably 40% or more, and still more preferably 50% or more.

The maintenance ratio can be measured as follows, for example, in the case of using an isocyanate compound as the moisture-curable component.

First, the ratio of the absorbance at 2275 cm$^{-1}$ derived from the isocyanate group and the absorbance at 2250-2255 cm$^{-1}$ derived from the methylene group of the base polymer obtained from the infrared spectroscopic measurement of the adhesive sheet (adhesive layer) immediately after the preparation is calculated. Here, the absorbance ratio is the ratio of the absorbance derived from the above-mentioned isocyanate group to the absorbance derived from the above-mentioned methylene group (the absorbance derived from the isocyanate group/the absorbance derived from the methylene group). In addition, the absorbance ratio obtained from the infrared spectroscopic measurement of the adhesive sheet (adhesive layer) after storage at 25° C. and 50% RH for 24 hours is similarly calculated, and the maintenance ratio of the moisture-curable component (isocyanate compound) is calculated from the change ratio thereof. Specifically, it is calculated from the following relational expression.

Maintenance ratio of moisture-curable component (isocyanate compound) (%)={(Absorbance ratio of adhesive sheet after storage at 25° C. and 50% RH for 24 hours)/(Absorbance ratio of adhesive sheet immediately after preparation)}×100

Incidentally, in the case where the moisture-curable component is one other than an isocyanate compound, the maintenance ratio of the moisture-curable component can be calculated from the change ratio of the absorbance ratio at the wave number where a typical peak derived from the moisture-curable component appears in the infrared spectroscopic measurement.

With regard to the adhesive composition, the adhesive layer, and the adhesive sheet (adhesive composition and the like) of the present embodiment, in order to maintain the unreacted state of the unreacted moisture-curable component in the adhesive composition and the like, it is preferable to reduce or block the influence of surrounding water (water and moisture). For example, the adhesive sheet of the present embodiment may be packaged in a suitable package. Examples of the material of the package include an aluminum-made moisture-proof bag and the like, but the material is not limited thereto. Further, the atmosphere inside the package may be the air, but may be replaced by an inert gas such as nitrogen or argon. In addition, a desiccant such as silica gel may be also packaged inside the package.

An adherend to which the adhesive sheet of the present embodiment is to be pasted is not particularly limited, but one capable of chemically bonding to the moisture-curable component in an unreacted state in the adhesive composition (adhesive layer) is preferable. For example, in addition to concrete, mortar, asphalt, metal, wood, tiles, and plastic materials such as a coated surface and inner wall of a bathroom, skin, bone, teeth, inside of a living body, and the like may be mentioned.

EXAMPLES

Hereinafter, embodiments of the present invention will be specifically described using Examples, but the invention should not be construed as being limited thereto.

<Preparation of Adhesive Composition>

Example 1

After a styrene-isoprene-styrene block copolymer (SIS) (Quintac QTC 3520 manufactured by Zeon Corporation) and isoprene rubber (LIR-30 manufactured by Kuraray Co., Ltd.) as base polymers was dissolved in toluene as a solvent, hexamethylene diisocyanate (HDI) (Basonat HA2000 manufactured by BASF SE) as a moisture-curable component, and a copolymer of isobutylene-maleic anhydride (KI gel manufactured by Kuraray Trading Co., Ltd.) as a water-absorbing material, and a liquid completely hydrogenated rosin methyl ester resin (M-HDR manufactured by Maruzen Petrochemical Co., Ltd.) as a tackifier are blended to the solution so that the proportions of respective components relative to the total amount of the components of the adhesive composition excluding the solvent might become the proportions described in Table 1, thereby preparing an adhesive composition of Example 1.

Example 2

An adhesive composition of Example 2 was produced in the same manner as in Example 1 except that the moisture-curable component was changed to Takenate D-101E (tolylene diisocyanate, TDI) manufactured by Mitsui Chemicals, Inc.

Example 3

An adhesive composition of Example 3 was produced in the same manner as in Example 1 except that the moisture-curable component was changed to Takenate D-120N (hydrogenated xylene diisocyanate, H$_6$XDI) manufactured by Mitsui Chemicals, Inc.

Example 4

An adhesive composition of Example 4 was produced in the same manner as in Example 4 except that the moisture-curable component was changed to Takenate D-140N (isophorone diisocyanate, IPDI) manufactured by Mitsui Chemicals, Inc.

Example 5

A high-molecular-weight polyisobutylene polymer (Opanol N80 manufactured by BASF SE), a low-molecular-weight polyisobutylene polymer (Tetrax 5T manufactured by JXTG Energy Corporation), and liquid polybutene (HV-300 manufactured by JXTG Energy Corporation) as base polymers were dissolved in toluene as a solvent. Thereafter, into this solution, hexamethylene diisocyanate (HDI) (Basonat HA2000 manufactured by BASF SE) as a moisture-curable component, a copolymer of isobutylene-maleic anhydride (KI gel manufactured by Kuraray Trading Co., Ltd.) as a water-absorbing material, a petroleum resin (Escollets 1202U manufactured by EMG Marketing G. K.) as a tackifier, and heavy calcium carbonate (manufactured by Maruo Calcium Co., Ltd.) as a filler were blended so that the proportions of respective components relative to the total amount of the components of the adhesive composition excluding the solvent might become the proportions described in Table 2, thereby producing an adhesive composition of Example 5.

Example 6

An adhesive composition of Example 6 was produced except that, in Example 5, changes were made so as to use a modified acrylic polymer (Aqualic CS-6S manufactured by Nippon Shokubai Co., Ltd.) as a water-absorbing material, an alkoxysilyl group-containing polymer (Silyl SAX510 manufactured by Kaneka Corporation), another alkoxysilyl group-containing polymer (Silyl SAT145 manufactured by Kaneka Corporation), and hexamethylene diisocyanate (HDI) (Basonat HI 2000 manufactured by BASF SE) as moisture-curable components and blending was performed so that the proportions of respective components relative to the total amount of the components of the adhesive composition excluding the solvent might become the proportions described in Table 2.

Example 7

Into a reaction vessel equipped with a stirrer, a thermometer, a nitrogen gas inlet tube, a reflux condenser and a dropping funnel were charged 100 parts by weight of butyl acrylate (BA) as a monomer component and 190 parts by weight of toluene as a polymerization solvent, followed by stirring for 2 hours while introducing nitrogen gas. After thus removing oxygen in the polymerization system, 0.3 parts by weight of 2,2'-azobisisobutyronitriled as a polymerization initiator was added and solution polymerization was carried out at 60° C. for 6 hours, thereby obtaining a solution of a polymer of butyl acrylate (BA) (acrylic polymer 1). Into this solution were blended hexamethylene diisocyanate (HDI) (basonat HA2000 manufactured by BASF SE) as a moisture-curable component, KI gel manufactured by Kuraray Trading Co., Ltd. as a water-absorbing material, and a liquid completely hydrogenated rosin methyl ester resin (M-HDR manufactured by Maruzen Petrochemical Co., Ltd.) as a tackifier so that the proportions of respective components relative to the total amount of the components of the adhesive composition excluding the solvent might become the proportions described in Table 2, thereby producing an adhesive composition of Example 7.

Comparative Example 1

Into a reaction vessel equipped with a stirrer, a thermometer, a nitrogen gas inlet tube, a reflux condenser and a dropping funnel were charged 100 parts by weight of butyl acrylate (BA) and 10 parts by weight of acrylic acid (AA) as monomer components and 190 parts by weight of toluene as a polymerization solvent, followed by stirring for 2 hours while introducing nitrogen gas. After thus removing oxygen in the polymerization system, 0.3 parts by weight of 2,2'-azobisisobutyronitriled as a polymerization initiator was added and solution polymerization was carried out at 60° C. for 6 hours, thereby obtaining a polymer solution containing a copolymer of 100 parts by weight of butyl acrylate (BA) and 10 parts by weight of acrylic acid (AA) (acrylic polymer 2). Into this solution were blended tolylene diisocyanate (TDI) (Coronate L manufactured by Tosoh Corporation) as a moisture-curable component, KI gel manufactured by Kuraray Trading Co., Ltd. as a water-absorbing material, and a liquid completely hydrogenated rosin methyl ester resin (M-HDR manufactured by Maruzen Petrochemical Co., Ltd.) as a tackifier so that the proportions of respective components relative to the total amount of the components of the adhesive composition excluding the solvent might become the proportions described in Table 2, thereby producing an adhesive composition of Comparative Example 1.

Comparative Example 2

Into a reaction vessel equipped with a stirrer, a thermometer, a nitrogen gas inlet tube, a reflux condenser and a dropping funnel were charged 100 parts by weight of butyl acrylate (BA) and 5 parts by weight of acrylic acid (AA) as monomer components and 190 parts by weight of toluene as a polymerization solvent, followed by stirring for 2 hours while introducing nitrogen gas. After thus removing oxygen in the polymerization system, 0.3 parts by weight of 2,2'-azobisisobutyronitriled as a polymerization initiator was added and solution polymerization was carried out at 60° C. for 6 hours, thereby obtaining an acrylic polymer solution containing a copolymer of 100 parts by weight of butyl acrylate (BA) and 5 parts by weight of acrylic acid (AA) (acrylic polymer 3). Into this solution were blended hexamethylene diisocyanate (HDI) (Coronate HL manufactured by Tosoh Corporation) as a moisture-curable component, KI gel manufactured by Kuraray Trading Co., Ltd. as a water-absorbing material, and a liquid completely hydrogenated rosin methyl ester resin (M-HDR manufactured by Maruzen Petrochemical Co., Ltd.) as a tackifier so that the proportions of respective components relative to the total amount of the components of the adhesive composition excluding the solvent might become the proportions described in Table 2, thereby producing an adhesive composition of Comparative Example 2.

(Water Content of Base Polymer)

The water content of the base polymer after storage at 25° C. and 50% RH was measured as follows. Tables 1 and 2 show the results.

As a release liner, a polyester-made release film (trade name "Diafoil MRF", thickness of 38 μm, manufactured by Mitsubishi Polyester Corporation) having a release surface subjected to release treatment on one side was prepared. A solution of the base polymer according to each example was applied to the release surface of the release liner, dried at 130° C. for 5 minutes to form a polymer sheet (polymer layer) having a thickness of 20 μm. The other surface of the polymer layer formed on the above release liner was pasted to the release surface of the same release liner as the release liner already pasted, thereby producing a polymer sheet whose double sides were protected with the release liner.

After peeling the release liner from both sides of the polymer sheet thus produced, it was stored for 24 hours under an environment of 25° C. and 50% RH, and measured by Karl Fischer moisture vaporization-coulometric titration method (JIS K 0113: 2005). Specifically, using Hiranuma trace-level water content measuring device AQ-2100 manufactured by Hiranuma Sangyo Co., Ltd., the amount of water generated by heating and evaporation at 200° C. for 30 minutes, and the ratio to the sample weight before heating was regarded as the water content.

Water content (%)=(amount of water measured by Karl Fischer method/Total weight of sample before measurement)×100

(Moisture Permeability of Base Polymer)

The moisture permeability of a polymer sheet (polymer layer) having a thickness of 100 μm at 40° C. and 90% RH was measured as follows. Tables 1 and 2 show the results.

As a release liner, a polyester-made release film (trade name "Diafoil MRF", thickness of 38 μm, manufactured by Mitsubishi Polyester Corporation) having a release surface subjected to release treatment on one side was prepared. A solution of the base polymer according to each example was applied to the release surface of the release liner, dried at 130° C. for 5 minutes to form a polymer sheet (polymer layer) having a thickness of 100 μm. The other surface of the polymer layer formed on the above release liner was pasted to a PET film having a thickness of 25 μm (Lumirror S-10 manufactured by Toray Industries, Inc., moisture permeability: 24 $g/m^2 \cdot 24$ hr), thereby producing a laminated film where a polymer sheet was formed on the PET film, one side of the polymer sheet being protected with the release liner.

The release liner was peeled off from the produced laminated film. Subsequently, the moisture permeability T of the laminated film was calculated by measuring the amount of water vapor permeation from the first room at 25° C. and 50% RH to the second room at 40° C. and 90% RH using a MOCON water vapor permeability measuring device manufactured by Hitachi High-Tech Science Corporation. Thereafter, the moisture permeability R ($g/m^2 \cdot 24$ hr) of only the polymer sheet was calculated according to the following calculation expression.

$$R = 1/(1/T - 1/24)$$

TABLE 1

|  |  | Example 1 | | Example 2 | | Example 3 | | Example 4 | |
| --- | --- | --- | --- | --- | --- | --- | --- | --- | --- |
| Base polymer | Kind | QTC3520 (SIS) | LIR-30 (IR) | QTC3520 (SIS) | LIR-30 (IR) | QTC3520 (SIS) | LIR-30 (IR) | QTC3520 (SIS) | LIR-30 (IR) |
|  | Content (wt %) | 29.5% | 16.0% | 29.5% | 16.0% | 29.5% | 16.0% | 29.5% | 16.0% |
|  | Water content (ppm) | 150 | 220 | 150 | 220 | 150 | 220 | 150 | 220 |
|  | Moisture permeability ($g/m^2 \cdot 24$ hr) | 15 | 3 | 15 | 3 | 15 | 3 | 15 | 3 |
| Moisture-curable material | Kind | HA2000 | | D-101E | | D-120N | | D-140N | |
|  | Content (wt %) | 4.5% | | 4.5% | | 4.5% | | 4.5% | |
| Water-absorbing material | Kind | KI gel | | KI gel | | KI gel | | KI gel | |
|  | Content (wt %) | 4.5% | | 4.5% | | 4.5% | | 4.5% | |
| Tackifier | Kind | M-HDR | | M-HDR | | M-HDR | | M-HDR | |
|  | Content (wt %) | 45.5% | | 45.5% | | 45.5% | | 45.5% | |
| Filler | Kind | — | | — | | — | | — | |
|  | Content (wt %) | — | | — | | — | | — | |

TABLE 2

|  |  | Example 5 | | | Example 6 | | | Example 7 | Comparative Example 1 | Comparative Example 2 |
| --- | --- | --- | --- | --- | --- | --- | --- | --- | --- | --- |
| Base polymer | Kind | Opanol N80(PIB) | Tetrax 5T(PIB) | Rubber modifier Liquid polybutene HV-300 | Opanol N80(PIB) | Tetrax 5T(PIB) | Rubber modifier Liquid polybutene HV-300 | Acrylic polymer 1 (BA:100) | Acrylic polymer 2 (BA/AA = 100/10) | Acrylic polymer 3 (BA/AA = 100/5) |
|  | Content (wt %) | 11.6% | 16.0% | 23.2% | 11.4% | 11.4% | 22.7% | 44.4% | 42.4% | 42.4% |
|  | Water content (ppm) | 50 | 30 | 10 | 50 | 30 | 10 | 440 | 4000 | 1500 |
|  | Moisture permeability ($g/m^2 \times 24$ hr) | 2 | 2 | 3 | 2 | 2 | 3 | 22 | 23 | 13 |
| Moisture-curable material | Kind | HA2000 | | | SAX510 | SAT145 | HI2000 | HA2000 | Coronate L | Coronate HL |
|  | Content (wt %) | 3.7% | | | 1.6% | 1.6% | 2.3% | 4.4% | 2.5% | 2.5% |
| Water-absorbing material | Kind | KI gel | | | Aqualic CS-6S | | | KI gel | KI gel | KI gel |
|  | Content (wt %) | 3.7% | | | 3.6% | | | 6.7% | 12.7% | 12.7% |
| Tackifier | Kind | Escollets 1202U | | | Escollets 1202U | | | M-HDR | M-HDR | M-HDR |
|  | Content (wt %) | 23.1% | | | 22.7% | | | 44.4% | 42.4% | 42.4% |
| Filler | Kind | Heavy calcium carbonate | | | Heavy calcium carbonate | | | — | — | — |
|  | Content (wt %) | 23.1 | | | 22.7% | | | — | — | — |

(Liquid Life of Adhesive Composition)

For the adhesive composition of each of Examples and Comparative Examples, the liquid life of the adhesive composition was evaluated according to the following evaluation criteria by confirming an increase in liquid viscosity one hour after the addition of the moisture-curable component (isocyanate) to the solution of the base polymer (toluene solution containing 34% of solids). Table 3 shows the results.

O: no increase in liquid viscosity x: gelation (cannot be applied due to increase in liquid viscosity)

(Maintenance Ratio of Moisture-Curable Component after Open Storage of Polymer Sheet)

For each example, using a polymer sheet (20 μm in thickness) produced by adding 5 parts of a moisture-curable component (isocyanate) to 100 parts by weight of a base polymer, the maintenance ratio of the moisture-curable component after open storage of the polymer sheet was calculated by tracking the reactivity of the isocyanate using an infrared absorption spectrum. Table 3 shows the results.

First, the ratio of the absorbance at 2275 cm$^{-1}$ derived from the isocyanate group and the absorbance at 2250-2255 cm$^{-1}$ derived from the methylene group of the base polymer obtained from the infrared spectroscopic measurement (using 3100 FT-IR manufactured by Varian) of the polymer sheet immediately after preparation was calculated. Here, the absorbance ratio is the ratio of the absorbance derived from the above-mentioned isocyanate group to the absorbance derived from the above-mentioned methylene group (the absorbance derived from the isocyanate group/the absorbance derived from the methylene group). In addition, the absorbance ratio obtained from the infrared spectroscopic measurement of the polymer sheet after storage under an environment of 25° C. and 50% RH for 24 hours was similarly calculated, and the maintenance ratio of the moisture-curable component (isocyanate compound) was calculated from the change ratio thereof. Specifically, it is calculated from the following relational expression.

Maintenance ratio of moisture-curable component (isocyanate compound) (%)=[(Absorbance ratio of polymer sheet after storage under environment of 25° C. and 50% RH for 24 hours)/(Absorbance ratio of polymer sheet immediately after preparation)]×100

(Maintenance Ratio of Moisture-Curable Component after Open Storage of Adhesive Sheet)

As a release liner, a polyester-made release film (trade name "Diafoil MRF", thickness of 38 μm, manufactured by Mitsubishi Polyester Corporation) having a release surface subjected to release treatment on one side was prepared. The adhesive composition according to each example was applied to the release surface of the release liner, dried at 80° C. for 5 minutes, and then dried at 130° C. for another 30 minutes to form an adhesive layer having a thickness of 300 μm. The other surface of the adhesive layer formed on the above release liner was pasted to the release surface of a paper-made release film (manufactured by Oji F-Tex Co., Ltd.) to produce an adhesive sheet whose both surfaces were protected with the release liners. For the adhesive sheet (adhesive layer), the maintenance ratio of the moisture-curable component after open storage was calculated. Table 3 shows the results.

First, the ratio of the absorbance at 2275 cm$^{-1}$ derived from the isocyanate group and the absorbance at 2250-2255 cm$^{-1}$ derived from the methylene group of the base polymer obtained from the infrared spectroscopic measurement (using 3100 FT-IR manufactured by Varian) of the adhesive sheet (adhesive layer) immediately after preparation was calculated. Here, the absorbance ratio is the ratio of the absorbance derived from the above-mentioned isocyanate group to the absorbance derived from the above-mentioned methylene group (the absorbance derived from the isocyanate group/the absorbance derived from the methylene group). In addition, the absorbance ratio obtained from the infrared spectroscopic measurement of the adhesive sheet (adhesive layer) after storage under an environment of 25° C. and 50% RH for 24 hours was similarly calculated, and the maintenance ratio of the moisture-curable component (isocyanate compound) was calculated from the change ratio thereof. Specifically, it is calculated from the following relational expression.

Maintenance ratio of moisture-curable component (isocyanate compound) (%)=[(Absorbance ratio of adhesive sheet after storage under environment of 25° C. and 50% RH for 24 hours)/(Absorbance ratio of adhesive sheet immediately after preparation)]×100

(Maintenance Ratio of Moisture-Curable Component after Moisture-Proof Storage of Adhesive Sheet)

There was prepared an adhesive sheet where both surfaces of an adhesive layer having a thickness of 300 μm were protected with two sheets of release liners, which was produced in the same manner as above.

After the adhesive sheet was stored for 7 days together with a desiccant (silica gel) in an aluminum-made moisture-proof bag, the maintenance ratio of the moisture-curable component in the adhesive sheet (adhesive layer) immediately after opening the bag was calculated by the same method as above. Table 3 shows the results.

<Measurement of 180° Peel Adhesive Force to Wet Surface>

As a release liner, a polyester-made release film (trade name "Diafoil MRF", thickness of 38 μm, manufactured by Mitsubishi Polyester Corporation) having a release surface subjected to release treatment on one side was prepared. A solution of the adhesive composition according to each example was applied to the release surface of the release liner, dried at 80° C. for 10 minutes, and further dried at 130° C. for 30 minutes to form an adhesive layer having a thickness of 300 μm. The other surface of the adhesive layer formed on the above release liner was pasted to a substrate film having a thickness of 25 μm to produce a single-sided adhesive sheet. As the substrate film, a PET film (resin film) manufactured by Toray Industries, Inc., a trade name "Lumirror S-10" was used. The adhesive sheet produced in this manner was cut into a size of a width of 20 mm and a length of 10 cm, and the adhesive force measurement to be mentioned later was performed. Incidentally, in order to maintain the non-reacted state of the moisture-curable component, the produced adhesive sheet was sealed together with a desiccant (silica gel) in a moisture-proof bag made of aluminum until the adhesive force measurement.

A slate standard plate, a product name "JIS A5430 (FB)" manufactured by Nippon Test Panel Co., Ltd. (hereinafter also referred to as slate plate), which had a thickness of 3 mm, a width of 30 mm, and a length of 125 mm, was prepared. The glossy surface of this slate plate was used. The slate plate was dried at 130° C. for 1 hour and the weight of the slate plate at this point was measured and defined as "weight of slate plate before immersion in water".

Subsequently, in a state where the prepared slate plate was immersed in water, degassing was performed for 1 hour with an ultrasonic degassing apparatus (BRANSON 3510 manufactured by Yamato Scientific Co., Ltd.), allowed to stand overnight, and then taken out from water. The weight of the slate plate at this point was measured and defined as "weight of slate plate after immersion in water and degassing".

When the moisture content of the slate plate was calculated from the following expression based on the measured "weight of slate plate before immersion in water" and "weight of slate plate after immersion in water and degassing", the content was 25% (% by weight).

Moisture content of slate plate (% by weight)=[{
(Weight of slate plate after immersion in water and degassing)−(Weight of slate plate before immersion in water)}/(Weight of slate plate before immersion in water))]×100

Subsequently, immediately after the prepared adhesive sheet (test piece) from which the release liner had been peeled off was crimped and pasted onto the surface (wet surface) of the slate plate having a moisture content of 25% by weight by reciprocating a 2 kg roller once, the sheet was immersed in water and allowed to stand at 23° C. for 24 hours. Thereafter, the slate plate to which the adhesive sheet (test piece) had been pasted was taken out from the water, and 180° peel adhesive force (N/25 mm) to the slate plate was measured at a peeling temperature of 23° C. and a peeling speed of 300 mm/min using a tensile tester (Technograph TG-1kN manufactured by Minebea Inc.). Table 3 shows results thereof.

released out of the polymer, the reaction of the moisture-curable component with the water in the polymer can be promoted. In addition, since a polar functional group capable of reacting with the moisture-curable component is highly hydrophilic, the group itself not only reacts with the moisture-curable component but also has an aspect of promotion of the reaction with water, the group is considered to be unsuitable from the viewpoint of storage stability.

Although the preferred embodiments of the present invention have been described above, the present invention is not limited to the above-described embodiments, and various modifications and substitutions can be added to the above-described embodiments without departing from the scope of the present invention.

The present application is based on Japanese Patent Application No. 2016-232749 filed on Nov. 30, 2016 and Japanese Patent Application No. 2017-229395 filed on Nov. 29, 2017, and the contents are fully incorporated herein by reference.

The invention claimed is:

1. An adhesive composition comprising:
a base polymer comprising an acrylic polymer;
a water-absorbing polymer; and
a moisture-curable component,
wherein
the base polymer contains a polymer having no functional group which reacts with the moisture-curable component,

TABLE 3

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Liquid life | O | O | O | O | O | O | O | × (gelation) | × (gelation) |
| Maintenance ratio (%) of moisture-curable component after open storage of polymer sheet 25° C./50% RH after 7 days At blending of polymer/NCO = 100/5 | 98 | 70 | 60 | 89 | 95 | 95 | 75 | 10 | 9 |
| Maintenance ratio (%) of moisture-curable component after open storage of adhesive sheet 25° C./50% RH after 1 day | 95 | 70 | 95 | 98 | 98 | 80 | 70 | 10 | 10 |
| Maintenance ratio (%) of moisture-curable component after moisture-proof storage of adhesive sheet Moisture-proof packaging after 7 days | 95 | 96 | 95 | 95 | 95 | 98 | 95 | — | — |
| 180° peel adhesive force to wet slate plate (N/20 mm) | 16 | 16 | 16 | 16 | 20 | 18 | 15 | 0.5 | 0.5 |

As shown in Tables 1 to 3, the adhesive compositions and adhesive sheets of Examples 1 to 7, where the moisture content falls within the range defined by the present invention and the base polymer is composed of a polymer having no functional group that reacts with a moisture-curable component, had high storage stability and exhibited high adhesive force to a wet surface.

On the other hand, the adhesive compositions and adhesive sheets of Comparative Examples 1 and 2, where the water content exceeds the range defined by the present invention and the base polymer is composed of a polymer having a functional group that reacts with a moisture-curable component, had low storage stability and also exhibited low adhesive force to a wet surface.

It is considered that, since a material having a higher water content tends to retain water in the polymer and thus the water is less likely to diffuse and is less likely to be a water content of the base polymer after storage at 25° C. and 50% RH for 24 hours is 0.1% by weight or less,
a content of the moisture-curable component is 3.7% and 30% by weight based on all the components of the adhesive composition excluding a solvent,
a content of the water-absorbing polymer is 3.6% to 30% by weight based on all the components of the adhesive composition excluding a solvent,
the content of the moisture-curable component is less than or equal to the content of the water-absorbing polymer, and
the moisture-curable component is contained in an unreacted state.

2. The adhesive composition according to claim 1, wherein the base polymer has a moisture permeability at 40° C. and 90% RH of 25 g/m²·24 hr or less when forming a layer having a thickness of 100 μm.

3. The adhesive composition according to claim 1, wherein the moisture-curable component is capable of chemically bonding to an adherend.

4. The adhesive composition according to claim 1, wherein the moisture-curable component is an aliphatic isocyanate or an alicyclic isocyanate.

5. An adhesive layer comprising the adhesive composition according to claim 1.

6. An adhesive sheet comprising the adhesive layer according to claim 5.

7. The adhesive sheet according to claim 6, wherein the adhesive layer is formed on a substrate.

* * * * *